Oct. 30, 1934.   G. H. JOHANSON ET AL   1,978,947
TIME CONTROLLED CIRCUIT CONTROLLER
Filed Aug. 19, 1930   2 Sheets-Sheet 2
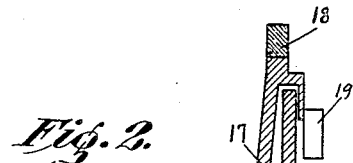
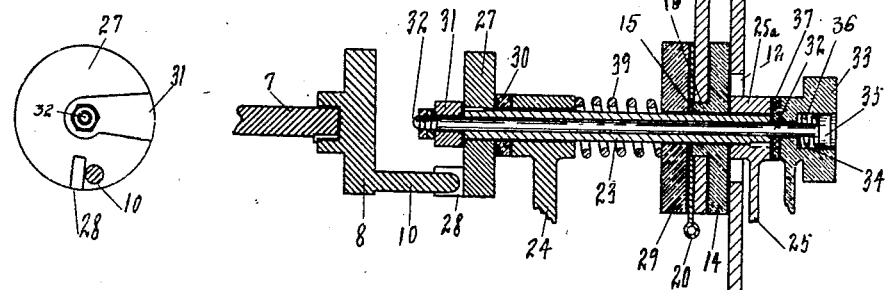
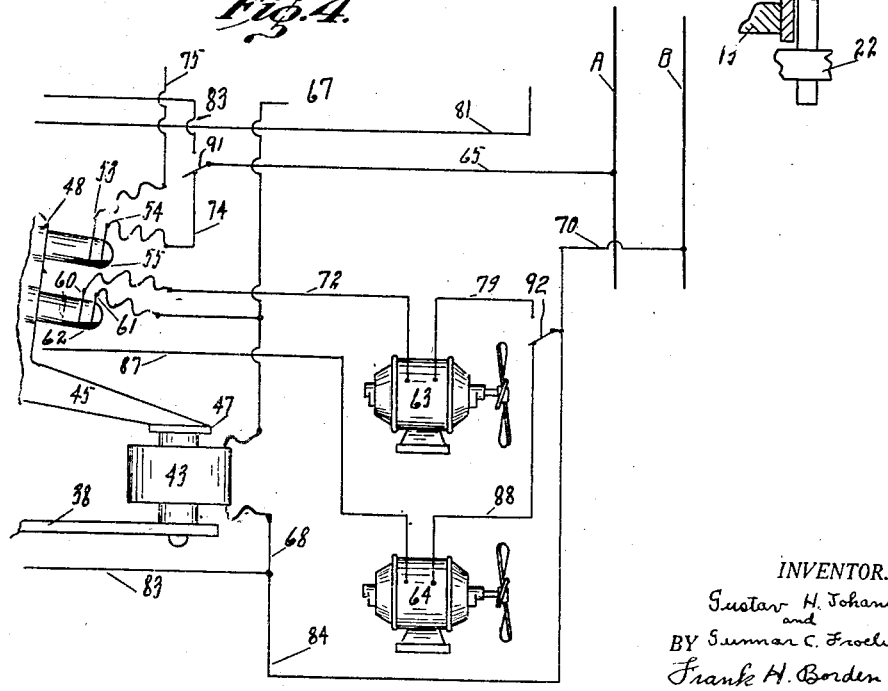

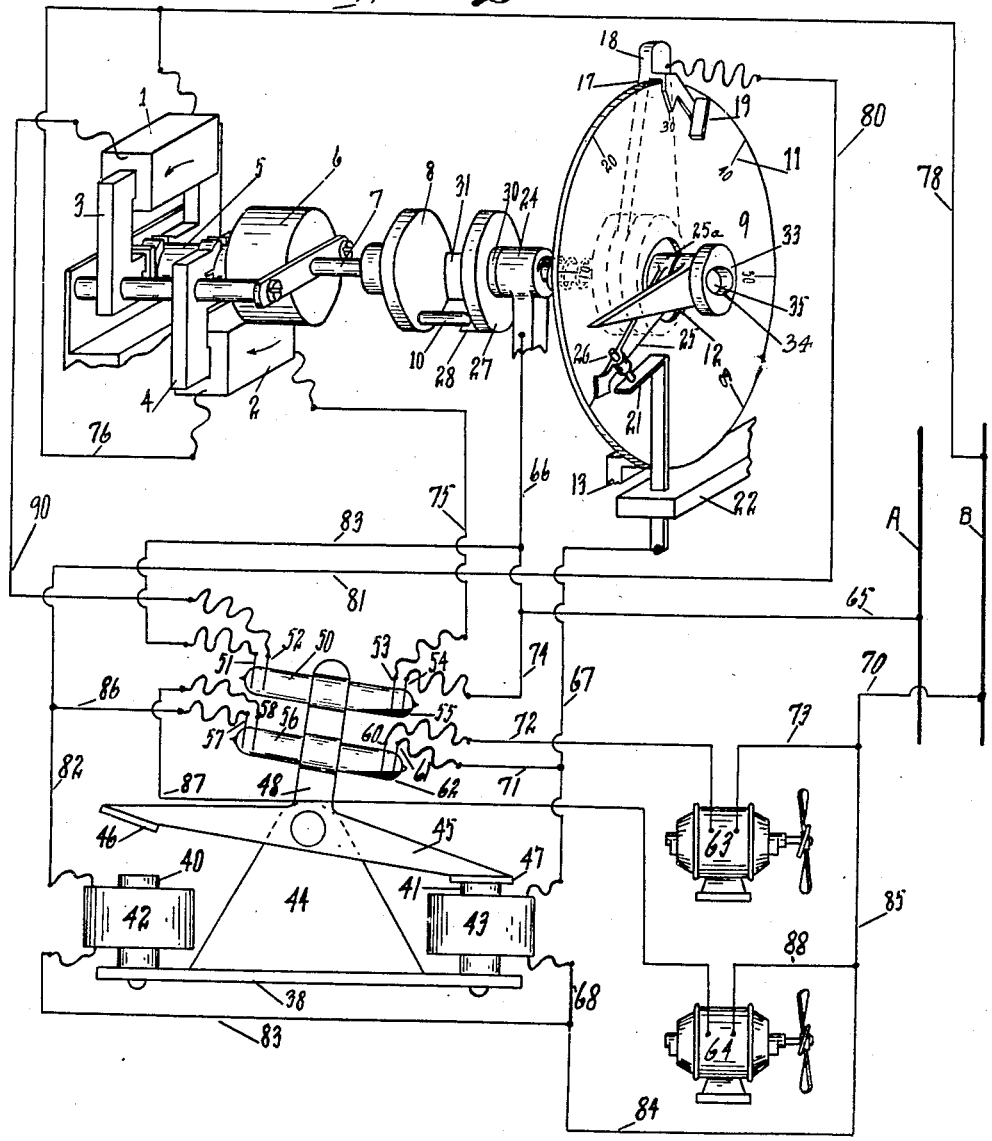

Patented Oct. 30, 1934

1,978,947

UNITED STATES PATENT OFFICE 1,978,947

TIME CONTROLLED CIRCUIT CONTROLLER

Gustav H. Johanson and Gunnar C. Froelich, Philadelphia, Pa., assignors, by mesne assignments, to Automatic Temperature Control Co., Inc., Philadelphia, Pa., a corporation of Pennsylvania Application August 19, 1930, Serial No. 476,354

16 Claims. (Cl. 172—239)

This invention relates to time controlled circuit controllers.

It is among the objects of this invention; to provide a time controlled circuit controller of simplicity, efficiency and low cost; to provide a time controlled circuit controller of such construction and operation as to insure a long life for the instrument; to provide a time controlled circuit controller such that the circuits established may be maintained for predetermined but variable lengths of time; to provide a time controlled circuit controller such that the time interval between the establishment of circuits and the duration of an established circuit each may be independently varied; to provide in a time controlled circuit controller a continuously repeated cycle of circuit controlling operations; to provide a time controlled circuit controller normally capable of continuously repeated circuit controlling operations, but adjustable to effect a stop cycle of circuit controlling operations; all as will become more apparent as the description proceeds, as will further objects and advantages.

In the accompanying drawings,

Fig. 1 represents a diagrammatic perspective of a purely illustrative form of the invention, Fig. 2 represents a vertical section through driven elements of the instrument, disclosing the relative adjustability of the elements, Fig. 3 represents an elevation of one element of the lost motion driving connection of the instrument, and Fig. 4 represents a slightly modified form of the diagrammatic wiring diagram wherein a stop cycle of circuit controlling operations is secured.

The invention comprises, preferably, a continuously running electric timing unit with contacts adjustable to predetermine the timing intervals, and with an adjustable lost motion connection such as to predetermine the duration of the established circuit. The timing unit is preferably automatically reversible to form a continuously repeated cycle of circuit controlling operations.

It is preferred to use a reversing self starting alternating current synchronous motor which is now a standard generally known article on the market, as the timing driving unit. The motor as illustrated is purely for example, however, as any electric motor that can conveniently be reversed by sending current to it alternating through one or the other of two wires, and which runs with uniform speed can be used. The motor has a field winding 1 on an iron core 3, tending to force the motor counterclockwise, and has an oppositely wound coil 2 on an iron core 4, tending to force the motor in a clockwise direction, both directions of force being indicated by arrows appropriately placed on the designated coils for purposes of clarity. Each core has an open side to form pole shoes fitting over the armature enclosed in a housing 5, which is extended to form the enlarged housing 6, within which latter is mounted a reduction gearing of any desired sort, as preferably a train of spur gears, (not shown), sufficient to transform the high speed of the motor into the slow speed of a shaft 7, extending from the housing 6. Obviously the gearing will be so arranged as to effect a desired synchronized speed to the motor shaft 7, and which is the driving speed forming a factor in the timing of the instrument. The motor, as disclosed, can be operated clockwise or counter-clockwise at will, by sending current through either coil 2 or 1.

The shaft 7 terminates in a disc 8, the outer face of which is in a vertical plane from which a crank arm or pin 10 projects, disposed eccentrically of the axis of shaft 7. It will be observed that rotation of the motor in either direction will cause the crank arm or pin 10 to traverse an arcuate path concentric with the axis of shaft 7. The contact making elements are arranged for actuation by the crank pin or arm 10.

The contact assembly may be comprised as shown, although obviously many modifications may be made therein without effecting any change in the operation of the instrument. For illustrative purposes therefore, there will be provided a dial 9, having peripheral graduations, 11, representing units of time according to the requirements of the instrument. The dial will have an aperture 12 in its center and will be mounted on a fixed support 13 in concentric relation to the axis of the motor driven shaft 7. Preferably mounted on the inner face of the dial and fixed thereto is an insulating support or bearing 14, having an axial bore 15 concentric with the opening 12 of the dial, and having an axial tubular extension 16 extending perpendicularly from its rear face. An adjustable contact arm 17 is mounted on the tubular extension 16 of the washer, and has an insulated knob or handle 18 disposed preferably beyond the peripheral edge of the dial in position to be grasped by the operator for adjusting the arm. The contact arm 17 carries a contact element 19, preferably overhanging the front of dial 9 so as to be set with relation to the graduations on the dial. A terminal washer 20 is mounted on the adjustable arm 17, in electrical connection with the contact element 19, and to which connections will be made to complete the circuit through contact 19, although for purposes of clarity such connection is illustrated in Fig. 1 as extending directly to the contact element. An insulating friction washer 29 and spring 39 hold arm 17. A fixed contact element 21 is mounted in insulated relation to the dial 9, carried by any desired sort of insulating support, such as 22.

The moving elements of the timing assembly include a tubular shaft 23, journalled toward the motor in a fixed bearing 24, concentric with the axis of shaft 7, suitably supported, and journalled in the insulating bearing 14 on the dial, and extending through the aperture 12 in the dial. The tubular shaft carries at the dial end the hub 25a of a moving contact arm 25. The arm 25 extends radially of the hub and overlies the graduations on the dial, and carries the contact making element 26 arranged to make contact with either contact element 21 or 19 at the end of its arcuate travel with the contact arm 25. The hub 25a has clearance in the aperture 12 of the dial. For purposes of the explanation it will be assumed that bearing 24 is a terminal for electrical connectors, and that the circuit is through the tubular shaft 23, contact arm 25 to contact element 26. Mounted on the motor end of the tubular shaft 23 is a disc 27 the face of which is preferably in a plane parallel to the plane face of the disc 8 on the motor shaft 7, but the discs being slightly spaced apart. Integral with the disc 27 is a stop 28 off-set from the axis of the disc, in position to be laterally abutted by the crank pin or arm 10 on disc 8. The disc 27 is preferably insulated from the tubular shaft although in driving relation thereto, and is preferably spaced from the bearing 24 by an insulating friction washer 30. Movement of disc 27 and therefore of the moving contact arm 25 is resisted by the washer 30, so that the contact arm 25 remains wherever it may be when the rotating power is ineffective, although the resistance is so slight as to have no adverse effect upon the motor driven shaft 7.

In order to vary the time function of the device, a movable abutment 31 is provided and arranged for fixed but variable angular relation to the disc 27, and adjustable on an axis concentric with the axis of the tubular shaft 23. The abutment 31 is rigidly but preferably insulatedly carried by a rod or shaft 32, rotatably disposed in the tubular shaft 23. The shaft 32 and therefore the abutment 31 is oscillatable in a manner to be described to vary the setting of the abutment 31 relative to the fixed stop 28, and also to the crank arm or pin 10 carried by the disc 8. It will be understood that the abutment 31 has an eccentric portion extending radially of the axis to lie in the path of travel of the crank pin 10. The rod or shaft 32 extends beyond the end of the tubular shaft 23 and extends into an insulated knob or pointer handle 33, having the oval recess 34, and has an oval head 35. The movable abutment 31 is pulled toward the disc 27, and the pointer knob 33 is pulled toward a friction washer 37 by a coil spring 36 seated on the bottom of the recess 34 and engaging the under side of the enlarged head 35 of the rod or shaft 32. The friction washer is so disposed as to firmly lock the movable abutment 31 to the disc 27, through the engagement between the rear of the pointer knob and the face of the hub carried by the movable contact arm 25, but which is released by outward movement of the pointer knob against the tension of the spring 36, so that the movable abutment 31 may be adjusted relative to the fixed stop 28 without moving the disc 27. If it is desired to also adjust disc 27 for any reason this may be done by manual engagement thereof or through any suitable mechanism, (not shown).

Setting the abutment 31 relative to the fixed stop 28 varies the time during which the motor driven crank arm 10 may travel in its arcuate path without striking either abutment or stop, and thus without affecting the position of the contact making arm 25. Setting the adjustable contact element 19 relative to the fixed contact element 21 varies the time between circuit controlling operations.

With the parts so far described it will be noted that rotation of the motor in one direction, say for instance in a counterclockwise direction will in due course cause pin 10 to engage stop 28 on disc 27 and move the contact making arm 25 toward the stationary contact element 21, against the slight frictional drag of the whole. Assuming that the contact thus established reverses the motor, as by disrupting the circuit through coil 1 and energizing coil 2 of the motor, the crank pin 10 will immediately thereupon move arcuately away in a clockwise direction from the stop 28, but without disrupting the circuit established through contact elements 26 and 21 which is maintained through the frictional resistance to movement of the assembly. At a predetermined interval in the clockwise movement of the crank pin 10, set by the setting of the movable abutment 31, and after the lapse of a predetermined interval in which no circuits are affected, the pin 10 will abut the abutment 31, and thereafter the contact making arm will be forced to travel away from the stationary contact 21, immediately disrupting the circuit therethrough. Continued movement thereafter will cause the contact element 26 on arm 25 to engage the contact element 19 to close another circuit. It is to be noted that the duration of the circuit through contact arm 25 and stationary contact, 21, or 19 for that matter, may be varied from zero to any time desired, as by having no lost motion between disc 8 and 27, when the movable abutment is only separated from the fixed stop by the thickness of the pin 10, to a maximum lost motion connection by providing the greatest arcuate spacing of the fixed and movable abutments.

The time set by adjustment of the movable or adjustable contact element 19 is independent of the lost motion connection as it only functions after the predetermined time interval for maintaining the circuit has elapsed.

The instrument so far disclosed may find considerable usefulness as it stands, or in conjunction with any desired sorts of relays or the like. For certain purposes however it is better to incorporate a relay. The relay disclosed may obviously be modified in accordance with desire or the necessities of the case, and this is to be construed as purely illustrative for the purpose.

On a suitable base 38, there are mounted a pair of spaced iron cores 40 and 41, upon which respectively there are wound the coils 42 and 43. The base also carries the upstanding arm 44, upon which the rocker arm 45 is pivotally mounted, carrying at its ends the shoes of magnetic material 46 and 47. The rocker arm carries a perpendicular extension 48 extending above the pivot of the rocker arm 45. A mercury tube 50 is mounted toward the upper end of the arm 48, carrying at one end contact tips 51 and 52, and at the other end contact tips 53 and 54. A globule of mercury is in the tube as at 55. A second mercury tube 56 is mounted below the first tube, and has at one end contact tips 57 and 58, and at the other end contact tips 60 and 61. It contains a globule of mercury 62. The tubes are each arranged with their longitudinal axes parallel with the rocker arm 45, and are each well above the axis of oscillation of the rocker arm. It is important and will be explained further, to note that oscillation of the rocker arm causes each mercury tube to move longitudinally in an arcuate path so that each globule of mercury remains, through centrifugal force, in the end in which it is lying at the initiation of the oscillation and does not run to the other end of the tube until an appreciable interval after the pulling magnet has been energized.

For illustrative purposes only, it will be assumed that the load may be represented by two blowers 63 and 64, which respectively may effect low or negative conditions, and high or positive conditions. It will be apparent that the load may be any electrically operated device which it may be desired to operate for desired intervals at desired intervals, such for instance as bells, relays, valve controllers, signal lights, solenoids, and the like.

For illustrative purposes the power source will be considered to be the leads A and B, which supply all of the current used in the assembly. Obviously, depending upon requirements, additional supply lines of different voltages may be supplied.

Assuming that the parts are in the position shown in Fig. 1, with suitable connectors to be identified disposed to connect electrically the various elements, it will be observed that contact element 26 has engaged contact element 21, closing a circuit through the coil 43 of the double acting relay. This circuit holds the relay in the position illustrated. The circuit will be from the lead A, through wires 65 and 66, through the bearing 24, tubular shaft 23, contact arm 25, contact element 26, stationary contact 21, wire 67, coil 43, wires 68, 84, 85 and 70 to the other side of the line at B. There will also be a circuit through the blower 63, as follows: line A, wires 65, 66, bearing 24, shaft 23, contact arm 25, contacts 26 and 21, wire 67 and 71, contact tip 61 in tube 56, globule of mercury 62, contact tip 60, wire 72, blower 63, wire 73, 70 and back to the other side of the line B. Thus, as long as the moving contact arm 25 is down in engagement with the stationary contact element 21, the blower or other load 63 will be actuated.

With the parts in the positions shown there will also be a circuit established through coil 2 of the motor, starting its clockwise running, as follows: from line A, wire 65, wire 74, contact tip 54, mercury 55 in tube 50, contact tip 53, wire 75, coil 2 of the motor, wires 76, 77, and 78 back to the other side of the line at B. Thus at the instant of assuming the positions shown in Fig. 1, the blower 63 is started, and the motor starts running in a clockwise direction, and if the movable abutment 31 were moved arcuately so as to engage the pin 10, then, immediately upon the starting of the clockwise movement of pin 10, the contact arm 25 would move away from the stationary contact 21, and the circuit through the blower or other load would be of but an instant's duration. However, depending upon the initial setting of the movable abutment 31, the timing motor continues to run in a clockwise direction until after a predetermined interval it engages the movable abutment. During this interval the contact arm 25 has been held frictionally against movement and the circuits through the stationary contact 21 is maintained. As soon as the pin 10 engages the movable abutment the contact arm 25 begins to swing away from the stationary contact 21, immediately disrupting its circuits, and begins its arcuate travel toward the adjustable contact 19. The latter has, of course been set in a predetermined timed relation to the stationary contact 21, so that there will be a timed interval in which the contact arm 25 engages neither of the circuit contacts, neither 19 nor 21. This is a period of inactivity, during which neither blower is actuated, and, clearly the circuit through the coil 43 has also been disrupted.

At the conclusion of the predetermined time interval just described, contact arm 25 has progressed far enough so that contact element 26 establishes an electrical contact with the adjustable contact 19. It is a relatively slow approach that is made by the contact arm 25 toward either relatively stationary contact, so that it is highly probable that before an intimate and firm physical, or metal to metal, contact is established between the contacts, there has been a spark contact established, which would be sufficient to establish a circuit through the relay, which, if of ordinary construction would function instantaneously to reverse the direction of movement of the timing motor, and the flow of current would have to be through the imperfect contact thus established, with such consequent pitting and erosion of the contacts as would render their efficiency and lives quite short. However, with the form of relay disclosed, and such modifications thereof as will occur to those skilled in the art, the closing movement continues for an appreciable interval after the spark contact is established, to an extent sufficient to establish a firm and intimate contact, such as to so reduce arcing and other erosive effects to a minimum. This is a factor of importance in the efficiency and long life of the instrument.

It is a feature of the relay disclosed that such lag is afforded as to permit the motor to have a follow up action to insure the making of a firm contact, although clearly there may be other forms of relays that may also be used in the connection, and it is not desired to limit to the details of the relay disclosed.

Assuming that the contact arm 25 has moved close enough to contact 19 as to effect a spark contact, there is immediately established a circuit through coil 42 of the double acting relay, as follows: from line A, wire 65, 66, bearing 24, tubular shaft 23, contact arm 25, contact element 26, adjustable contact 19, wires 80, 81, and 82, coil 42, wires 83, 84 and 85, 70, and back to the other side of the line at B. The establishment of the circuit immediately energizes the core 40, which magnetically pulls down shoe 46, thus swinging the rocker arm 45 about its horizontal pivot. This action, as previously explained, causes the mercury tubes to be given an arcuate swing longitudinal of their axes, with the desired concomitant effect of maintaining during the oscillation the mercury globules in the ends of the tubes in which they lie at the beginning of the oscillation. This result is through centrifugal force or inertia, and insures a continuation of the circuit through the contact tips with which the mercury is in contact during practically all of the oscillating movement of the rocker arm, so that it is not until the end of the oscillation that the globules roll in the tubes away from the first set of contact tips toward the contact tips in the other ends, to break the initial circuit and immediately establish a second circuit. Thus the circuit in the motor coil 2 is maintained for a short interval after the energization of the coil 42, and a firm contact is made by 26 on 19. This interval of lag is obviously variable, and may be accomplished in other ways by other mechanisms, but with the double acting relay disclosed, it may be as high as one half second or more.

When the rocker arm has assumed a position with the shoe 46 pulled down on magnetic core 40, the mercury in the tubes will then roll down from the high set of contact tips to the low set of contact tips, and thereupon establish a circuit through the counterclockwise coil 1 of the motor, and through the blower 64. The last circuit will be from line A, wire 65, 66, bearing 24, shaft 23, contact arm 25, contact element 26, contact 19, wire 80, 81, 86, contact tip 57, mercury 62 in tube 56, contact tip 58, wire 87, blower 64, wires 88, 85, 70, back to the other side of the line at B. The circuit through the counterclockwise coil 1 of the timing motor, is from line A, wire 65, 83, contact tip 51, mercury globule 55 in tube 50, contact tip 52, wire 90, coil 1, wire 77, and 78, back to the other side of the line at B. The timing motor will immediately have stopped running clockwise and instantaneously will have reversed and started running counterclockwise. The reversed running of the timing motor will not disrupt the circuit through the blower 64 until after a predetermined but variable time interval has elapsed, determined, of course, by the setting of the movable abutment relative to the fixed stop on disc 27. It will only move the contact arm 25 downwardly away from the adjustable contact 19 after the lost motion between abutment 31 and stop 28 has been traversed by the pin 10.

The mechanism so far described discloses a continuously repeating cycle of timing operations, in which both the time of duration of an established circuit is predetermined but variable, and the time between the establishment of alternate circuits is predetermined but variable.

It will be clear that if it were desired to accomplish a single timed operation, or a stop cycle of the instrument, it may be done quite simply by introducing a switch in the line affecting the alternate use of the coils 1 and 2 of the timing motor, and a similar synchronously operated switch in the line running to the respective blowers. Thus, as purely illustratively disclosed in Fig. 4, a simple two pole switch 91 is interposed between line wire 65, and wires 83 and 74. A similar coordinated switch 92 may be interposed in the line between wire 70 and wires 73 and 88 extending to the respective blowers. Preferably the switches 91 and 92 would be in a single unit manually operable either simultaneously or independently. With such manual switches in the line the conclusion of a timing movement of the contact arm 25 would trip the rocker arm of the double acting relay and break the circuits passing though the high contact tips in the respective tubes, but could not close new circuits through either the timing motor or through a blower owing to the open switches in those circuits if both were opened. Closing of the switches 91 and 92 thereafter would establish both a motor circuit and a blower circuit, the motor circuit would be continued for a timing interval after the blower circuit was disrupted, and at the conclusion of the inactive timing interval the moving contact arm would establish such circuit as would trip the rocker arm of the relay and disrupt both the timing motor and blower circuits if switches 91 and 92 were both open. The instrument would remain at rest until the switches 91 and 92 were either manually or automatically actuated, and another stopped cycle of circuit controlling would begin. It will be clear that the operation of switches 91 and 92 might be made dependent upon some condition of the work, and responsive automatically to such condition. Thus the insertion of new work might actuate a mechanism to trip the switches 91 and 92, (not shown).

While this invention will be of obvious multitudinous uses in the arts, it has particular relevance to the art of timing processes of all kinds, much as those of rubber molding, rubber vulcanizing, enameling, japanning, starting an electric motor to run for a predetermined length of time, for controlling the travel of work through a processing such as heat treatment, and opening and closing valves and the like on a time basis.

It will be obvious that many modifications and changes will occur to those skilled in the art, and all such are to be construed as within the scope of the invention as recited in the appended claims.

We claim:

1. In a time controlled circuit controller, a timed moving element, a pair of relatively adjustable contacts, a movable contactor, means operatively associating the moving element and the movable contactor, said means arranged to cause a predetermined movement of the element without actuating the contactor.

2. In a time controlled circuit controller, a timed electrically operated constant speed driving element, a movable contactor in driven relation to the element, circuit contacts in the path of movement of the contactor, electric means responsive to engagement of the contactor and a contact for reversing the element, and means for interrupting the driving relation of the element and contactor for a predetermined time interval and means for predeterminedly varying said last mentioned time interval.

3. In a time controlled circuit controller, a reversible motor, an oscillatable contact arm, a pair of relatively adjustable contacts selectively engaged by the contact arm, means engaging the motor with the contact arm to move it in one direction, and adjustable means for engaging the motor with the contact arm for movement in the other direction, the adjustment being such that the oscillatable contact arm is maintained in engagement with a contact for a predetermined interval.

4. In a time controlled circuit controller, a continuously driven reversible constant speed motor, means for alternately energizing opposite fields of the motor to cause continuous alternate driving and reversing thereof, independent circuit making elements, and means having a lost motion connection with the motor for operatively associating the motor and the independent circuit making elements to establish and maintain the independent circuit for a predetermined interval after the motor has reversed and is moving toward disruption of said independent circuit.

5. In a time controlled circuit controller, a reversible motor having two fields, an arm driven in a predetermined path by the motor, a movable contactor, contacts in the path of the contactor, stop means operatively associated with the contactor in position to be engaged by said arm, an abutment operatively associated with the contactor in position to be engaged by said arm, means for varying the relative position of the stop and abutment to effect a predetermined movement of the arm without movement of the contactor.

6. In a time controlled circuit controller, a primary electric device, a contact, means establishing a circuit through the device and contact, a second electric device, an adjustable contact, means establishing a circuit through the second device to the adjustable contact, a movable contact maker movable to engage either contact to complete the circuits therethrough, a reversible motor, means having a lost motion connection engaging the motor and the movable contact maker in driving relation, means for reversing the motor pursuant to the establishment of either circuit, but the lost motion connection so arranged as to maintain either established circuit after the motor has been reversed for a predetermined interval.

7. In a time controlled circuit controller, means establishing motor circuits and independent circuits, a movable contactor, a pair of relatively adjustable contacts disposed in the path of the contactor, a reversible constant speed motor, circuit controlling devices associated with said contacts and controlling the motor circuits and the independent circuits, means coupling the motor and contactor for driving relation, electrical means for reversing the motor operable pursuant to engagement of either contact by the contactor to continuously repeat a cycle of timing operations effected by the independent circuits.

8. In a time controlled circuit controller, a movable contactor, a pair of relatively adjustable contacts disposed in the path of the contactor, means operatively associated with the contacts and contactor to establish a plurality of independent circuits, a reversible constant speed motor, means having a lost motion interposed between the motor and the contactor whereby a time period of movement of the contactor from one contact to the other includes a predetermined period of maintenance of an established independent circuit established through one contact, followed by a predetermined period of inactivity as to established independent circuits, concluded by the establishment of another independent circuit of predetermined time interval when it reaches the other contact, and means for reversing the motor to repeat the same cycle.

9. In combination a hollow shaft, journals for the shaft, a contact arm in driven relation to the shaft, a crank operatively associated with the shaft in driving relation, a stop on the crank, a rod journalled in the shaft, an eccentric abutment mounted on the rod, a pointer mounted on the rod in predetermined angular relation to the abutment, means for adjusting the angular relation of the abutment to the stop on the crank, an adjustable contact journalled on the shaft, means for frictionally maintaining the adjustable contact in a position where set, a fixed contact, the fixed and adjustable contacts both lying in the path of movement of the contact arm, and rotatable means disposed between the stop and the abutment and arranged alternately to engage the stop or the abutment to rotate said shaft and contact arm.

10. In a time controlled circuit controller, a driving and a driven shaft in substantially coaxial relation, an eccentric stop and an eccentric abutment operatively associated with the driven shaft, means for varying the angular relationship of the stop and abutment whereby the arcuate clearance between them is varied, an eccentric arm carried by the driving shaft and having a portion disposed between the stop and the abutment, a contact arm operatively associated with the driven shaft and relatively adjustable contact elements disposed relative to the driven shaft so as to lie in the path of movement of said contact arm.

11. In a time controlled circuit controller, a driving and a driven shaft in substantially coaxial driven relation with the driving shaft arranged for alternate running in opposite directions, means coupling the driving and driven shaft in driving relation in one direction of rotation, means coupling the driving and driven shafts in driving relation in the other direction of rotation, means operable to modify the last two mentioned means as to permit a variable degree of rotation of the driving shaft without affecting the driven shaft, and a circuit controller operatively associated with the driven shaft.

12. In a time controlled circuit controller, a contact arm having a path of movement, a pair of relatively adjustable contact elements disposed so as to be alternatively engaged by the contact arm in its path of movement, a time controlled rotatable and reversible driving shaft, means coupling said driving shaft with the contact arm for driving relation in one direction, means coupling the driving shaft and the contact arm for rotation in the other direction, said coupling means arranged to permit a variable degree of rotation of the driving shaft without actuation of the contact element.

13. In a time controlled circuit controller, a time controlled reversible driving shaft, a dial substantially normal to the axis of said shaft, a fixed contact element disposed adjacent said dial, an adjustable contact element pivotally mounted on an axis substantially coincident with the axis of the driving shaft and having a portion disposed adjacent said dial, a contact arm disposed adjacent said dial on an axis coincident with that of the adjustable contact in position to engage the fixed and adjustable contact elements, means establishing driving relation of the driving shaft and said contact arm in one direction of rotation, means establishing driving relation of the driving shaft and the contact arm in the other direction of rotation, a pointer disposed adjacent said dial and operative about an axis coincident with that of the contact arm, and means operatively associating the pointer and said last mentioned means to dispose said means so that a variable degree of rotation of said driving shaft may occur without actuation of the contact arm as a function of the angular setting of said pointer relative to said dial.

14. In a time controlled circuit controller, a reversible constant speed motor, means establishing driving circuits in the motor, means operable by the motor for alternately closing driving circuits in the motor to continuously drive the motor in one direction and then in the other in a predetermined adjustable time cycle of running in each direction, means controlling independent circuits and actuated by the motor to successively close an independent circuit, open both independent circuits, and close an independent circuit within said adjustable time cycle, and means for predeterminedly varying the duration of closing of said independent circuits within said time cycle.

15. In a time controlled circuit controller, a reversible constant speed motor, means establishing driving circuits in the motor, means operable by the motor for alternately closing driving circuits in the motor to continuously drive the motor in one direction and then in the other in a predetermined timed cycle of running in each direction of running, means manually operated to vary the limits of the timed cycle to predetermined timed intervals, means establishing a plurality of independent working circuits, means operated by the motor within the adjustably timed cycle of operation thereof to successively close an independent circuit, open said last mentioned circuit, and close an independent circuit with a predetermined time interval of maintenance of the closed independent circuit, and means manually operated to vary the predetermined timed interval of closing of such independent working circuit.

16. In a time controlled circuit controller, a reversible constant speed motor, means establishing driving circuits in the motor, means operable by the motor for alternately closing driving circuits in the motor to drive the motor in one direction and then in the other in an adjustable timed period of running in each direction, the sum of the periods of running in both directions comprising a timed cycle, circuit controlling means actuated by the motor to successively perform two separated circuit controlling actions within said timed cycle, said actions each comprising the establishment of a circuit, the maintenance of the established circuit and the breaking of the established circuit, and means for predeterminedly varying the duration of maintenance of the established circuit within said timed cycle.

GUSTAV H. JOHANSON.
GUNNAR C. FROELICH.